United States Patent [19]

Hoskin et al.

[11] Patent Number: 4,590,996
[45] Date of Patent: May 27, 1986

[54] USE OF POLYALKOXY SULFONATE SURFACTANTS FOR INHIBITION OF SCALE FORMATION

[75] Inventors: Dennis H. Hoskin, Lawrenceville; L. Deane Rollmann, Princeton, both of N.J.; Gerald L. Shoemaker, Aurora, Ohio; Kirk D. Schmitt, Pennington, N.J.

[73] Assignee: Mobil Oil Corporation, New York, N.Y.

[21] Appl. No.: 681,391

[22] Filed: Dec. 13, 1984

[51] Int. Cl.$^4$ ............................................. E21B 43/12
[52] U.S. Cl. ................................. 166/244.1; 166/279; 166/310; 166/371; 252/8.55 B
[58] Field of Search ................... 166/244 C, 279, 310, 166/371, 369; 252/8.55 B, 82, 86, 180, 181

[56] References Cited

U.S. PATENT DOCUMENTS 3,977,471  8/1976  Gale et al. ..................... 166/275 X
4,460,481  7/1984  Schievelbein ................... 166/275 X

OTHER PUBLICATIONS

Johnson, "Water Scaling Problems in the Oil Production Industry", Spec. Publ. Roy. Chem. Soc., 1983 (45), 125.

Weinritt, et al., "Unique Characteristics of Barium Sulfate Scale Deposition," Petroleum Transactions, J., Pet. Tech., 1381, Oct. 1967.

Vetter, "How Barium Sulfate is Formed: An Interpretation", J. Pet. Tech., 1515, Dec., 1975.

Leung, et al., "Nitrilotri (Methylenephosphonic Acid) Adsorption on Barium Sulfate Crystals and Its Influence on Crystal Growth", J. Crystal Growth, 44, 163 (1978).

Templeton, "Solubility of Barium Sulfate in Sodium Chloride Solutions from 25° to 95° C.", J. Chem. Eng. Data, 5, 514 (1960).

Nancollas, et al., "Crystal Growth and Dissolution of Barium Sulfate", Soc. Pet. Eng. J., 509, Dec., 1975.

Primary Examiner—George A. Suchfield
Assistant Examiner—Thomas J. Odar
Attorney, Agent, or Firm—Alexander J. McKillop; Michael G. Gilman; Charles J. Speciale

[57] ABSTRACT

The accumulation of inorganic mineral scale such as barium sulfate in oil field formations and/or production equipment is inhibited by adding to formation fluid or produced fluid a scale formation inhibitory amount of a polyalkoxy sulfonate of the general formula $$(RO[R'O]_x(CH_2)_ySO_3)_zM$$

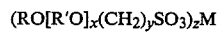

wherein R is a hydrophobe, R'O is a $C_2H_4O$ or a $C_3H_6O$ group or some combination thereof, M is a monovalent or divalet cation, x is 2 to 10, y is 0 to about 4 and z is 1 or 2.

13 Claims, No Drawings

USE OF POLYALKOXY SULFONATE SURFACTANTS FOR INHIBITION OF SCALE FORMATION

BACKGROUND OF THE INVENTION

The accumulation of inorganic mineral scales in oil field formations and production equipment is a major problem for the oil industry. Deposition of inorganic mineral scale in oil-bearing formations and on production tubing and equipment causes significant and costly loss of production. The primary offenders are carbonates and sulfates of calcium, barium and strontium. These compounds may precipitate as a result of changes in pressure, temperature and ionic strength of produced fluids or when connate reservoir waters mix with injected waters during secondary recovery operations. In order to avoid costly losses in production or post-scale treatments it is necessary to prevent deposition of barium sulfate scales downhole as well as in post production processing.

For more detailed discussions of the scaling problem in oil field production systems, reference may be made to Johnson, "Water Scaling Problems in the Oil Production Industry", *Spec. Publ., Roy. Chem. Soc.*, 1983 (45), 125; Weintritt, et al., "Unique Characteristics of Barium Sulfate Scale Deposition," *Petroleum Transactions, J., Pet. Tech.*, 1381, October, 1967; Vetter, "How Barium Sulfate Is Formed: An Interpretation" *J. Pet. Tech.*, 1515, December, 1975; Leung, et al., "Nitrilotri(Methylenephosphonic Acid) Adsorption on Barium Sulfate Crystals and Its Influence On Crystal Growth", *J. Crystal Growth*, 44, 163 (1978); Templeton, "Solubility of Barium Sulfate in Sodium Chloride Solutions from 25° to 95° C.", *J. Chem. Eng. Data*, 5, 514 (1960); and, Nancollas, et al., "Crystal Growth and Dissolution of Barium Sulfate", *Soc. Pet. Eng. J.*, 509, December, 1975.

Barium and strontium sulfate scales are of particular concern because of their extremely low solubilities ($10^{-4}$ to $10^{-5}$ Molar [Ba$^{++}$] depending upon brine concentrations and temperature). At room temperature the solubility of BaSO$_4$ in distilled water is about 2 ppm and at 80° C. is about 4 ppm. In 0.5M NaCl, the solubility is 7 ppm at room temperature and about 30 ppm at 80° C.; in 1.0M NaCl, about 23 and 42 ppm, respectively.

While effective measures have been developed for the removal of calcium carbonate and calcium sulfate scales, barium sulfate scaling is difficult to treat once it develops. Effective scale control measures for BaSO$_4$ are important in the North Sea and in other areas as well. Water from the North Sea contains 2,500–2,700 ppm sulfate, while formation waters from that area analyze as high 250 ppm barium.

SUMMARY OF THE INVENTION

In accordance with the present invention, a process is provided for inhibiting the deposition of mineral scales in oil field formation and production equipment which comprises combining formation fluid or produced fluid containing precipitable mineral salt with a precipitation inhibiting amount of at least one polyalkoxy sulfonate compound of the general formula:

(RO[R'O]$_x$(CH$_2$)$_y$SO$_3$)$_z$M wherein R is a hydrophobe, R'O is a C$_2$H$_4$O or a C$_3$H$_6$O group or some combination thereof, M is a monovalent or divalent cation, x is 2 to 10, y is 0 to about 4 and z is 1 or 2.

While the mode of action of these inhibitors is not clearly understood, it is speculated to be by interaction with the active growing sites of incipient scale crystallites. When precipitation does occur, the crystals are generally rough and distorted or greatly altered in their morphologies.

DESCRIPTION OF THE PREFERRED EMBODIMENTS

In accordance with the present invention, a dilute aqueous solution, for example, from about 0.001 to about 5.0% by weight, preferably from about 0.1 to about 1.0% by weight, of a polyalkoxy sulfonate having the general formula:

(RO[R'O]$_x$(CH$_2$)$_y$SO$_3$)$_z$M wherein R, R$^1$, M x, y and z are as defined above, when added to formation fluid or produced fluid containing precipitable mineral salt, e.g., a carbonate or sulfate of calcium, barium or strontium, especially barium sulfate, has been found to significantly inhibit the precipitation of the salt.

The amount of polyalkoxy sulfonate to be added to the produced fluid to inhibit precipitation of such dissolved salt will depend in varying degrees upon the nature of the particular polyalkoxy sulfonate precipitation inhibitor selected, the nature of the produced fluid, the nature and concentration of dissolved salt (barium sulfate being the most troublesome as previously indicated), the presence and concentration of brine and the temperature. For example, the polyalkoxy sulfonates are effective at concentrations of from about 1 to about 1,000 ppm, preferably from about 10 to about 200 ppm, at delaying or preventing barium sulfate precipitation from produced fluids containing barium sulfate concentrations of from about $10^{-2}$ to about $10^{-6}$ Molar [Ba$^{++}$], and preferably from about $10^{-3}$ to about $10^{-5}$ Molar [Ba$^{++}$], depending upon brine concentration and temperature. As will be appreciated by those skilled in the art, both the optimum amount and concentration of the aqueous solutions of polyalkoxy sulfonate compound used herein to inhibit scale formation in a given oil field formation can be readily determined employing simple and routine procedures such as those described in the working examples herein.

Examples of two especially effective types of compounds for use in the present invention are:

Type A:  RO(CH$_2$CH$_2$O)$_x$ CH$_2$CH$_2$CH$_2$SO$_3$Na

Type B:  
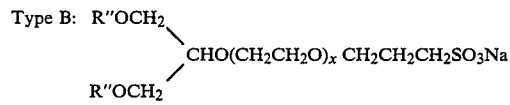

In the Type A compounds, hydrophobe R can be a linear or branched alkyl group containing from about 6 to about 20 carbons, preferably from about 8 to about 16 carbons atoms, or an alkylaromatic group containing from about 7 to about 21 carbon atoms such as nonylphenyl or octylphenyl. In the type B compounds each R" group of the hydrophobe group

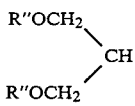

is the same or different and can be derived from epichlorohydrin and each R″ group therein can contain from about 4 to about 12 carbons and preferably from about 6 to about 10 carbon atoms.

In all of the above polyalkoxy sulfonates, M represents a monovalent or divalent cation such as sodium, potassium, lithium, ammonium, calcium, magnesium or quaternary ammonium, e.g.

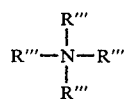

wherein R‴ can be the same or different and is, for example, an alkyl group having from 1 to about 3 carbon atoms or an aryl group such as phenyl or alkaryl such as benzyl. Preferably M is a monovalent cation such as sodium or ammonium and most preferably M is sodium.

The following table identifies a variety of polyalkyoxy sulfonate compounds which are advantageously used to inhibit scale formation in accordance with this invention:

TABLE 1

| Inhibitor No. | Polyalkoxy Sulfonate |
|---|---|
| 1 | $C_6H_{13}$\\CHCH$_2$O(CH$_2$CH$_2$O)$_3$C$_3$H$_6$SO$_3^-$Na$^+$ / $C_8H_{17}$<br><br>hexadecyltriethoxypropane sulfonate sodium salt |
| 2 | $C_4H_9$\\CHCH$_2$O(CH$_2$CH$_2$O)$_3$C$_3$H$_6$SO$_3^-$Na$^+$ / $C_6H_{13}$<br><br>dodecyltriethoxypropane sulfonate sodium salt |
| 3 | $C_4H_9$\\CHCH$_2$O(CH$_2$CH$_2$O)$_{3.03}$C$_3$H$_6$SO$_3^-$Na$^+$ / $C_6H_{13}$<br><br>dodecylpolyethoxypropane sulfonate sodium salt |
| 4 | $C_4H_9$\\CHCH$_2$O(CH$_2$CH$_2$O)$_2$C$_3$H$_6$SO$_3^-$Na$^+$ / $C_6H_{13}$<br><br>dodecyldiethoxypropane sulfonate sodium salt |
| 5 | $C_2H_5$\\CHCH$_2$OCH$_2$\\ / $C_4H_9$    CH—O(CH$_2$CH$_2$O)$_{3.17}$C$_3$H$_6$SO$_3^-$Na$^+$ $C_2H_5$\\CHCH$_2$OCH$_2$/ / $C_4H_9$<br><br>1,3-bis[(2-ethoxyhexyl)oxy]-2-propoxypolyethyleneoxypropane sulfonate sodium salt |
| 6 | $C_9H_{19}$—⌬—O(CH$_2$CH$_2$O)$_{4.2}$C$_3$H$_6$SO$_3^-$Na$^+$<br><br>nonylphenoxypolyethoxy propane sulfonate salt |

TABLE 1-continued

| Inhibitor No. | Polyalkoxy Sulfonate |
|---|---|
| 7 |  |
| | t-octylphenoxypolyethoxy propane sulfonate sodium salt |

The foregoing polyalkoxy sulfonate surfactant compounds are themselves known in the art and can be readily synthesized employing known and conventional procedures.

The following examples are illustrative of the present invention.

EXAMPLE 1

Polyalkoxy sulfonate scale formation Inhibitor Nos. 1 to 3 and 5 of Table 1 were tested for inhibition of $BaSO_4$ crystal growth by mixing the inhibitor into solutions which would produce either $1\times10^{-3}$ Molar [$BaSO_4$], in 0.5M or 1.0M NaCl, or $0.5\times10^{-3}$ Molar [$BaSO_4$] in 0.5 NaCl. The test used was to mix the inhibitor with the barium solution prior to mixing with the sulfate solution. The mixture was then visually examined periodically for evidence of precipitate formation. Any precipitates which developed were microscopically examined to determine the existence of crystal distortion, an indication of the effectiveness of precipitation inhibition.

The following results were observed*.

*In examples herein, 0=no effect (i.e., immediate precipitation; 1=precipitation observed after several hours; 2=precipitation only after about 24 hours; 3=no precipitation observed after several days.

TABLE 2

Inhibitory Effect of Polyalkoxy Sulfonates on Scale Formation

| | \multicolumn{7}{c}{Inhibitor Concentration (ppm)} | |
|---|---|---|---|---|---|---|---|---|
| | 2 | 5 | 10 | 20 | 40 | 80 | 160 | Crystal Morphology |
| \multicolumn{9}{c}{$BaSO_4 = 1 \times 10^{-3}$ M, NaCl = 0.5 M} |
| Inhibitor No. 1 | 1 | 1 | 1 | 1 | | | | Surface roughening to rounded three dimensional clusters with increasing concentration |
| Inhibitor No. 2 | | | 0 | 0 | 1 | 2 | | Surface roughening to rounded particles to fibrous with increasing concentration |
| Inhibitor No. 3 | | | 0 | 0 | 1 | 1 | | Tiny externals at low concentration; fibrous at high concentration |
| Inhibitor No. 5 | | | 0 | 1 | 2 | 2 | | Fibrous and rounded clusters |
| \multicolumn{9}{c}{$BaSO_4 = 1 \times 10^{-3}$ M, NaCl = 1.0 M} |
| Inhibitor No. 1 | 1 | 1 | 2 | 3 | | | | Surface roughening to rounded three dimensional clusters with increasing concentration |
| Inhibitor No. 2 | | | 0 | 1 | 3 | 2 | | Surface roughening to fibrous clusters |
| Inhibitor No. 3 | | | 0 | 1 | 2 | 3 | | Small external strings to fibrous clusters with increasing concentration |
| Inhibitor No. 5 | | | | 1 | 1 | 2 | 2 | Flakes to fibrous |
| \multicolumn{9}{c}{$BaSO_4 = 0.5 \times 10^{-3}$ M, NaCl = 0.5 M} |
| Inhibitor No. 1 | 1 | 1 | 3 | 3 | | | | Fibrous and clusters |
| Inhibitor No. 2 | | | | 1 | | | | Roughening and twinning |

As these data and crystal morphology observations show, while all of the tested polyalkoxy sulfonates tested were effective in inhibiting the formation of barium sulfate scale, the more effective inhibitors were Inhibitor Nos. 1 and 2. It was further observed that the inhibitory activity of the polyalkoxy sulfonates was relatively independent of pH, a useful property compared to other antiscaling compounds whose activities fall off sharply in acidic environments.

EXAMPLE 2

Polyalkoxy sulfonate scale formation Inhibitors Nos. 6 and 7 were evaluated by being individually mixed with a barium-containing solution (0.001 molar $BaSO_4$ and 1.0 molar NaCl (about 6% NaCl)) in concentrations ranging from 1 ppm to 100 ppm and subsequently mixed with the sulfate-containing solution. The mixtures were then visually examined for evidence of precipitate formation at regular intervals over several days. The inhibitors were first neutralized to pH 7.0 (monitored by pH meter with a Ross electrode) using either HCl or NaOH solutions. The tests were carried out at room temperature and atmospheric pressure. The test results are listed in Table II.

TABLE 3

Inhibitory Effect of Polyalkoxy Sulfonates on Scale Formation

| | \multicolumn{5}{c}{Inhibitor Concentration} |
|---|---|---|---|---|---|
| | 10 ppm | 20 ppm | 40 ppm | 80 ppm | 100 ppm |
| Inhibitor No. 6 | 1 | 1 | 1 | 1 | 2 |
| Inhibitor No. 7 | 1 | 1 | 1 | 2 | 3 |

As these data show, in both cases significant inhibition of scale formation was observed.

What is claimed is:

1. A process for inhibiting deposition of mineral scale in oil field formations and/or production equipment which comprises combining formation fluid produced or fluid containing precipitable mineral salt with a precipitation-inhibiting amount of at least one polyalkoxy sulfonate compound of the general formula:

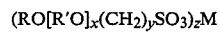

(RO[R'O]$_x$(CH$_2$)$_y$SO$_3$)$_z$M wherein R is a hydrophobe, R'O is a $C_2H_4O$ or a $C_3H_6O$ group or some combination thereof, M is a monovalent or divalent cation, x is 2 to 10, y is 0 to about 4 and z is 1 or 2.

2. The process of claim 1 wherein the inhibitor is a polyalkoxy sulfonate compound of the general formula:

$$RO(CH_2CH_2O)_xCH_2CH_2CH_2SO_3Na$$

in which R is a linear or branched alkyl group containing from 6 to about 20 carbon atoms or an alkylaromatic group containing from about 7 to about 21 carbon atoms.

3. The process of claim 2 in wherein R is a linear or branched alkyl group containing from about 8 to about 16 carbon atoms.

4. The process of claim 2 in wherein R is a nonylphenyl or octylphenyl group.

5. The process of claim 1 wherein the inhibitor is a polyalkoxy sulfonate compound of the general formula:

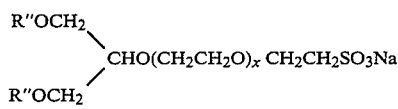

in which each R" is the same or different and contains from about 4 to about 12 carbon atoms.

6. The process of claim 1 wherein M is a monovalent cation selected from the group consisting of lithium, sodium, potassium and ammonium.

7. The process of claim 1 wherein M is a divalent cation selected from the group consisting of calcium and magnesium.

8. The process of claim 1 wherein M is a quaternary ammonium of the structure

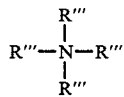

in which each R''' is the same or different and is an alkyl group of from 1 to 3 carbon atoms or an aryl or alkaryl group.

9. The process of claim 1 wherein the inhibitor is an alkoxy sulfonate sodium salt selected from the group consisting of compounds of the structure:

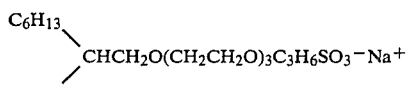

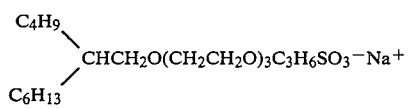

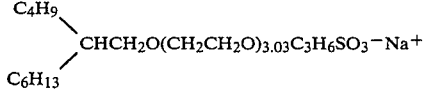

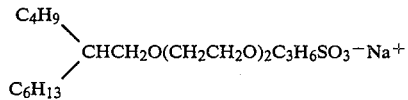

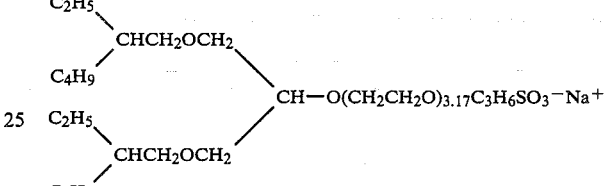

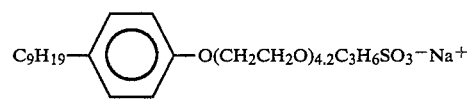

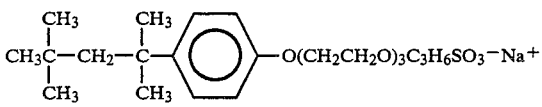

10. The process of claim 1 wherein the produced fluid is combined with polyalkoxy sulfonate present in aqueous solution at a level of from about 0.001% to about 5.0% by weight.

11. The process of claim 1 wherein the produced fluid is combined with polyalkoxy sulfonate present in aqueous solution at a level of from about 0.1% to about 1.0% by weight.

12. The process of claim 1 wherein the polyalkoxy sulfonate is present in the produced fluid at a concentration of from about 1 to about 1,000 parts by weight per million parts by weight of produced fluid.

13. The process of claim 1 wherein the polyalkoxy sulfonate is present in the produced fluid at a concentration of from about 10 to about 200 parts by weight per million parts by weight of produced fluid.

* * * * *